United States Patent
Holzapfel

(10) Patent No.: US 8,848,184 B2
(45) Date of Patent: Sep. 30, 2014

(54) OPTICAL POSITION-MEASURING DEVICE

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 390 days.

(21) Appl. No.: 13/309,021

(22) Filed: Dec. 1, 2011

(65) Prior Publication Data

US 2012/0162646 A1    Jun. 28, 2012

(30) Foreign Application Priority Data

Dec. 16, 2010 (DE) .......................... 10 2010 063 216
Sep. 6, 2011 (DE) .......................... 10 2011 082 156

(51) Int. Cl.
*G01J 4/00* (2006.01)
*G01B 11/14* (2006.01)

(52) U.S. Cl.
USPC .......................................... 356/369; 356/619

(58) Field of Classification Search
CPC ... G01D 5/38; G01D 5/34715; G01B 11/026; G01B 11/002; G01B 11/00; G01J 3/18
USPC ......... 356/499, 521, 494, 485–488, 490, 614, 356/615, 616, 620; 250/559.29
IPC ...................................... G01J 3/18; G01D 5/38
See application file for complete search history.

(56) References Cited

U.S. PATENT DOCUMENTS

| | | | |
|---|---|---|---|
| 5,696,374 A | 12/1997 | Fukui et al. | |
| 6,831,267 B2 * | 12/2004 | Ishizuka | 250/231.13 |
| 7,389,595 B2 * | 6/2008 | Meissner et al. | 33/707 |
| 2006/0092428 A1 | 5/2006 | Holzapfel et al. | |
| 2008/0285058 A1 * | 11/2008 | Holzapfel | 356/616 |

FOREIGN PATENT DOCUMENTS

| | | |
|---|---|---|
| DE | 10 2004 053 082 | 5/2006 |
| EP | 1 435 510 | 7/2004 |
| WO | WO 2011/000715 | 1/2011 |

OTHER PUBLICATIONS

W. Yu, et al., "Reduced wavelength-dependent quarter-wave plate fabricated by a multilayered subwavelength structure," Applied Optics 45(12): 2601-2606, Apr. 20, 2006.
M. Born, et al., "Principles of Optics," Cambridge University Press, p. 32-33, 1999.
S. Makinouchi, et al., "An evaluation of a modulated laser encoder," Precision Engineering 35: 302-308, 2011.

* cited by examiner

*Primary Examiner* — Gregory J Toatley
*Assistant Examiner* — Maurice Smith
(74) *Attorney, Agent, or Firm* — Kenyon & Kenyon LLP

(57) ABSTRACT

In an optical position-measuring device for recording the relative position of a scanning unit and a measuring standard, the scanning unit includes a light source, first annular scanning graduation, reflector element, beamsplitter element, and detection unit. A beam emitted by the light source impinges on the measuring graduation and is split into at least two partial beams of rays. The partial beams propagate toward the scanning unit, impinge the first scanning graduation on the reflector element, are reflected through the first scanning graduation toward the measuring graduation, impinge the measuring graduation, propagate toward the scanning unit and undergo superposition, and are deflected by the beamsplitter element toward the detection unit. There, a plurality of positionally dependent, phase-shifted scanning signals can be recorded. The first scanning graduation focuses the partial beams from the measuring graduation at the reflector element, thereby recollimating the partial beams to be reflected toward the measuring graduation.

15 Claims, 14 Drawing Sheets

24

25

123a   124

123b   125

324

325

427

OPTICAL POSITION-MEASURING DEVICE

CROSS-REFERENCE TO RELATED APPLICATIONS

The present application claims priority to Application No. 10 2010 063 216.3, filed in the Federal Republic of Germany on Dec. 16, 2010, and claims priority to Application No. 10 2011 082 156.2, filed in the Federal Republic of Germany on Sep. 6, 2011, each of which is expressly incorporated herein in its entirety by reference thereto.

FIELD OF THE INVENTION

The present invention relates to an optical position-measuring device.

BACKGROUND INFORMATION

An optical position-measuring device is described in U.S. Pat. No. 6,831,267. Reference is made in this regard to FIGS. 11 and 50, in particular. The position-measuring device is used for the high-resolution sensing of the relative position of a scanning unit and a measuring standard having a measuring graduation, the scanning unit and the measuring standard being movable relative to each other along at least one measuring direction. The scanning unit includes a light source, a first annular scanning graduation, a reflector element configured directly behind the same, a beamsplitter element, as well as a detection unit. A beam of rays emitted by the light source impinges on the measuring graduation where it is split into at least two partial beams of rays. The partial beams of rays reflected back to the scanning unit are re-reflected by the first scanning graduation and the reflector element in the direction of the measuring graduation, the partial beams of rays propagating, in turn, through the first scanning graduation on the path to the measuring graduation. The first scanning graduation is configured as a circular grating. A circular grating of this kind is composed of radially equidistantly configured, concentric grating bars. Following re-reflection at the measuring graduation, the partial beams of rays propagating in the direction of the scanning unit undergo superposition and are deflected by the beamsplitter element in the direction of the detection unit where a plurality of positionally dependent scanning signals can be recorded. The two partial beams of rays are mutually orthogonally polarized by supplementary optical polarization components in the beam path between the measuring graduation, the measuring standard and the first scanning grating, so that, in response to the relative movement of the measuring standard and the scanning unit, high-resolution, phase-shifted scanning signals can be generated in the detection unit using known optical polarization methods.

Due to the considerable cylindrical symmetry, the optical position-measuring device illustrated in the two mentioned figures of U.S. Pat. No. 6,831,267 supposedly has very high tolerances to tilting of the scanning unit relative to the measuring standard. Particularly in this connection, there is supposedly a particular insensitivity to what is generally referred to as Moiré tilt-angle variations. This is understood to be the tilting of the scanning unit and the measuring standard about an axis of rotation that is oriented normally to the measuring graduation plane.

However, in this type of optical position-measuring device there are various weak points in the discussed scanning optics. For example, the measuring graduation and the first scanning graduation influence the wavefront of the diffracted component beams very differently. In particular, the circular grating of the first scanning graduation distorts the wavefronts considerably since the grating bars are circularly arcuate. A first scanning graduation arranged in this manner is not suited for scanning a linear measuring graduation. Significant wavefront distortions arise in the split partial beams of rays that lead to an extremely low modulation depth of the scanning signals. Since there is a marked increase in the wavefront distortions transversely to the beam direction, a very small cross section needs to be selected for the incident beam coming from the light source. This makes the optical position-measuring device highly sensitive to contamination and defects.

Of even greater concern, however, is that the considerable wavefront distortions in the optical position-measuring device lead to extremely narrow installation, operating and manufacturing tolerances. In the context of such installation, operating and manufacturing tolerances, small lateral shifts in the two partial beams of rays arise. These lead to considerable local phase shifts in response to significant wavefront distortions, and thus to an insufficient interference of the superimposed partial beams of rays. This, in turn, results in a significant decline in the scanning signal intensity. Only in few application cases are the exceedingly narrow installation and manufacturing tolerances ascertained during simulations acceptable. These are the cases which, on the one hand, require a high tolerance to Moiré tilt-angle variations. On the other hand, however, all other tolerances must be significantly narrower than those associated with commercial optical position-measuring devices.

SUMMARY

Example embodiments of the present invention provide a high-resolution optical position-measuring device that is characterized by an insensitivity to such tilting of the scanning unit in relation to the measuring standard having the measuring graduation whose axis is oriented normally to the measuring graduation plane, and that, at the same time, provides high tolerances to other tilt-angle variations and displacements of the measuring standard.

According to example embodiments of the present invention, an optical position-measuring device includes a scanning unit and a measuring standard having a measuring graduation, the scanning unit and the measuring standard being movable in relation to each other along at least one measuring direction. The scanning unit has a light source, a first annular scanning graduation, a reflector element, a beamsplitter element, as well as a detection unit. A beam emitted by the light source impinges on the measuring graduation where it is split into at least two partial beams of rays. The partial beams of rays propagating in the direction of the scanning unit impinge via the first scanning graduation on the reflector element. The partial beams of rays are reflected at the reflector element in the direction of the measuring graduation and pass through the first scanning graduation on the path to the measuring graduation. After impinging again on the measuring graduation, the partial beams of rays propagating in the direction of the scanning unit undergo superposition and are deflected by the beamsplitter element in the direction of the detection unit where a plurality of positionally dependent, phase-shifted scanning signals may be recorded. The first scanning graduation is adapted to induce a focusing of the incident partial beams of rays from the measuring graduation at the reflector element. In addition, the first scanning graduation recollimates the partial beams of rays propagating in the direction of the measuring graduation after being reflected at the reflector element.

In this connection, it may also be provided for at least one optical polarization component to be positioned in the beam path of the split partial beams of rays in order to induce a mutual, linearly or circularly orthogonal polarization of the two partial beams of rays that have been split at the measuring graduation; and for polarizers to be configured in the detection unit upstream from a plurality of optoelectronic detector elements.

The at least one optical polarization component may either: produce an orthogonal polarization of the partial beams of rays into two diametrically disposed sectors; or result in a linear polarization that rotates azimuthally 180° over the circumference as a function of location.

At least one high-frequency grating, for instance, may be configured as an optical polarization component in the scanning beam path of the partial beams of rays.

Moreover, the reflector element may be arranged as an optical polarization component.

Another example embodiment may provide for a plurality of optical polarization components, in the form of retardation plates, to be provided in the scanning beam path of the partial beams of rays between the measuring graduation and the first scanning graduation or between the first scanning graduation and the reflector element.

After impinging for the second time on the measuring graduation, the superimposed partial beams of rays may propagate along the optical axis.

The first scanning graduation may be arranged as a diffractive ring lens having a quadratic phase function in accordance with:

$$\phi_{A1}(r) = -\frac{\pi}{d_M \cdot r_0} \cdot r^2$$

where $\Phi_{A1}(r)$ represents the radius-dependent phase function, r represents the radius, $d_M$ represents the grating period of the measuring graduation, and $r_0$ represents the radial distance of the principal ray impinging on the diffractive ring lens.

It is also possible that the partial beams of rays propagate in parallel to the optical axis after impinging for the first time on the first scanning graduation.

With the exception of the optical polarization components, the first scanning graduation and the reflector element may be configured cylindrically symmetrically to the optical axis, and the beam emitted by the light source may propagate along the optical axis.

It may be provided for the measuring graduation to be configured as a one-dimensional linear graduation, as a two-dimensional linear graduation, as a radial graduation, or as a circular graduation.

Moreover, a diffractive structure may be located in the region of a scanning reticle through which the beam emitted by the light source passes, the diffractive structure serving as a collimating lens for the incident beam from the light source, and/or as a grating beamsplitter for the incident, superimposed partial beams of rays from the measuring graduation. The first scanning graduation and the reflector element may be disposed on the front and rear side of the scanning reticle or vice versa.

The detection unit may include a beamsplitter which spatially divides the incident, superimposed partial beams of rays, and the split partial beams of rays may each propagate through polarizers before striking optoelectronic detector elements.

The beamsplitter may also be arranged as a grating beamsplitter. An optical delay line may be provided in the beam path of a partial beam of rays.

An advantage of the optical position-measuring device described herein is derived from the desired high tolerance to Moiré tilt-angle variations of the scanning unit and the measuring standard, while other high tolerances to tilt-angle and positional variations are provided at the same time. As a result, the optical position-measuring device also features high installation and operating tolerances. This is largely attributable to the arrangement of the first scanning graduation as a diffractive ring lens having an optimized phase response and a reflector that is spaced apart therefrom and that is disposed in the focal plane of the diffractive ring lens. This makes it possible to minimize interfering wavefront distortions in the scanning beam path.

Moreover, a beam cross section of an adequate size may be used when scanning the measuring standard and the measuring graduation, which, in turn, results in a low sensitivity to contamination.

Further features and aspects of example embodiments of the present invention are described in more detail below with reference to the appended Figures.

DETAILED DESCRIPTION

Figure 1:
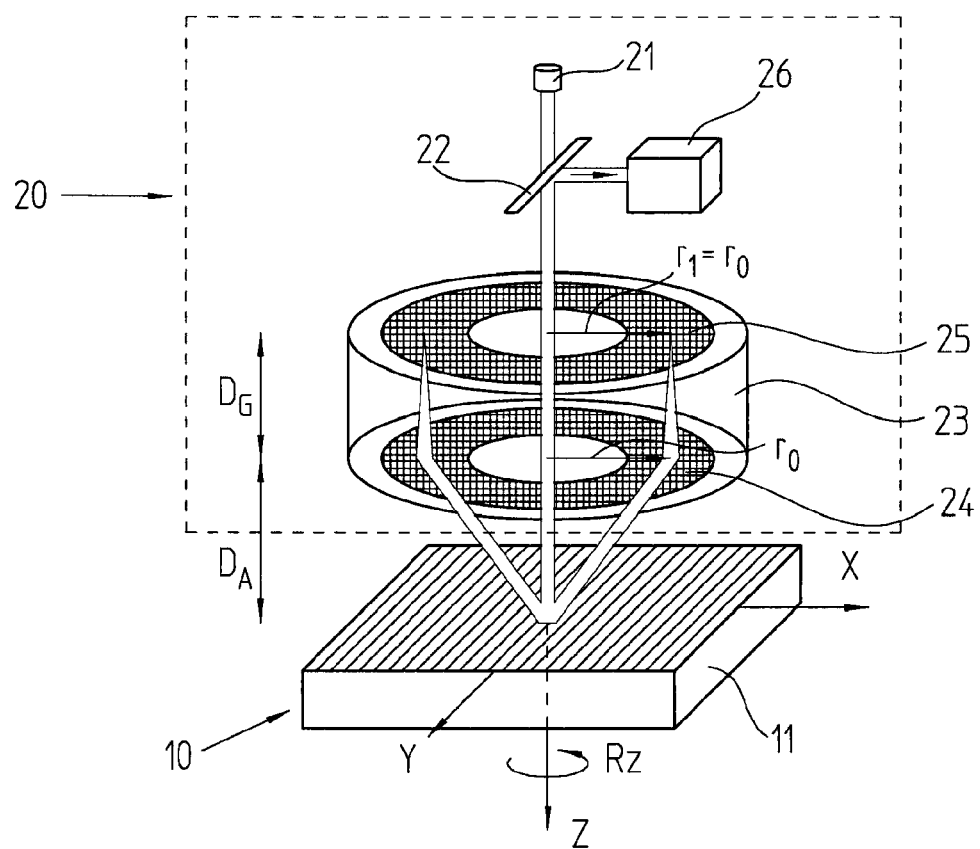
FIG. 1 schematically illustrates an optical position-measuring device according to an example embodiment of the present invention.

Before the various exemplary embodiments of the optical position-measuring device are described in detail, the scanning principle underlying all of the variants shall first be explained in the following.

Thus, it is provided for a measuring standard, the reflective or transmissive measuring graduation disposed thereon, to be illuminated along the optical axis by a—preferably collimated—beam from a light source. This causes a splitting and diffraction of the incident beams at the measuring graduation into two +1/−1 diffraction order partial beams of rays that propagate in the direction of the scanning unit. The partial beams of rays are subsequently focused in each instance via a first scanning graduation at a reflector element arranged downstream in the beam path. In this case, the first scanning graduation may be arranged as a cylindrically symmetrical, diffractive ring lens. A plurality of possible options for the specific reflector element form are explained in detail in the following with reference to the illustrated example embodiments. Thus, for instance, the reflector element may be arranged as a reflecting second scanning graduation or, however, as combination of a mirror and one or more optical polarization components, etc. The reflector element is located in the focal plane of the cylindrically symmetrical, diffractive ring lens. The two partial beams of rays are subsequently reflected back by the reflector element in the direction of the first scanning graduation.

Moreover, by properly arranging components in the scanning beam path, it is ensured that the two partial beams of rays, which are split at the measuring graduation, and measuring standard, are polarized mutually orthogonally. Thus, for instance, the partial beams of rays may undergo a mutual, linearly orthogonal polarization or, however, a mutual, circularly orthogonal polarization. To this end, at least one of the various elements in the beam path may be arranged as an optical polarization component. Thus, for instance, it may be provided for the measuring graduation or at least one of possibly several scanning graduations to be arranged as an optical polarization component. Moreover, additional optical polarization components, such as retardation plates and/or polarizers, for example, may be provided in the scanning beam path.

After passing through the first scanning graduation for the second time, the partial beams of rays reflected back by the reflector element are each recollimated by a renewed diffraction and subsequently propagate as collimated partial beams of rays in the direction of the measuring graduation, and measuring standard. At the measuring graduation, the incident partial beams of rays undergo a renewed diffraction into +1/−1 diffraction orders. The reflected partial beams of rays undergo superposition again to form one single beam which, after impinging for a second time on the measuring graduation, propagates along the optical axis in the direction of the incident beam coming from the light source. The superimposed pair of partial beams of rays is separated by a non-optical-polarization beamsplitter element, which is arranged in the beam path of the reflected-back partial beams of rays, from an incident beam propagating in the opposite direction, and is deflected in the direction of a detection unit. The detection unit includes various optical polarization components, as well as a plurality of optoelectronic detector elements for generating at least two phase-shifted scanning signals from the incident pair of superimposed partial beams of rays. The relative motion of the measuring standard and the scanning unit produces a plurality of scanning signals, e.g., incremental signals that are phase shifted relative to each other and that may be further processed using conventional methods.

In this connection, the light source, the first scanning graduation, the reflector element, the beamsplitter element, as well as the detection unit may be arranged in one scanning unit that is movable in relation to the measuring standard having the measuring graduation in at least one measuring direction.

Besides the advantages discussed above, the scanning beam path of the optical position-measuring device provides a number of other advantages over conventional optical position-measuring devices.

In terms of optical action, a retroreflector is provided by combining the diffractive ring lens of the first scanning graduation, which is traversed twice, and the reflector element located in the focal plane. It converts incident plane beams again into counter-propagating, again plane beams. In contrast to the circular grating, no significant wavefront distortions result in this case.

Thus, the scanning gratings may be arranged as planar diffractive lenses, that may be manufactured much more precisely and much less expensively than refractive lenses. In addition, the wavefront deformations in the partial beams of rays that result when scanning gratings of this kind are used are much less pronounced than in the case of refractive lenses.

Moreover, since the aperture of a diffractive lens may be freely selected, a ring lens may be readily formed. The ring lens influences only the deflected partial beams of rays, not, however, a beam passing through the center of the ring lens. This eliminates the need for the illuminating and counter-propagating, superimposed beam to pass through the same lens along the optical axis. Since the ring lens must be specially optimized to the focusing of obliquely incident component beams, it would be wholly unsuited for collimating an illuminating beam on the optical axis and would produce substantial wavefront aberrations. Thus, the simple limitation of aperture by a diffractive ring lens permits a separate influencing of a central beam and the obliquely deflected component beams. Only in this manner is it possible to sufficiently minimize the wavefront aberrations of the position-measuring device.

It should be understood that another diffractive lens, that is properly optimized for a collimating function, may be provided within the ring lens to collimate the illuminating beam. This type of aperture separation into a ring region and a central region having different deflection functions would not be possible in the case of refractive lenses since a high-precision polishing process does not permit any sharp transitions.

In addition, the optimized selection of the phase response of the ring lens in the first scanning graduation, and the optimal selection of other parameters of the optical position-measuring device allow especially high installation, operating and manufacturing tolerances on the part of the optical position-measuring device.

Moreover, the axial illumination and the axially emerging superimposed beam ensure that the scanning beam path is strictly cylindrically symmetrical from the splitting to the superimposition of the beam components. Deviations from the cylindrical symmetry apply only to components in the scanning beam path that exclusively influence the polarization of the beam components, not, however, the beam direction or beam location thereof. This deviation from the cylindrical symmetry is necessary in order to generate a plurality of phase-shifted scanning signals.

In addition, a monolithic configuration may ensure substantially drift-free scanning optics, whereby the first scanning graduation and the reflector element are applied to both sides of one scanning reticle, for instance.

Various example embodiments of the optical position-measuring device, that are each based on the previously explained scanning principle, are described in more detail below.

First Example Embodiment

Figure 2A:
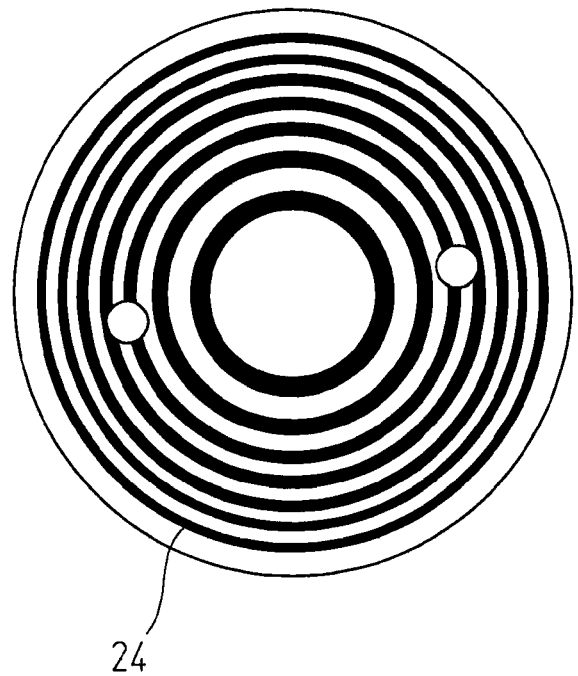
FIGS. 2a and 2b each show a view of components of the optical position-measuring device illustrated in FIG. 1.
Figure 2B:
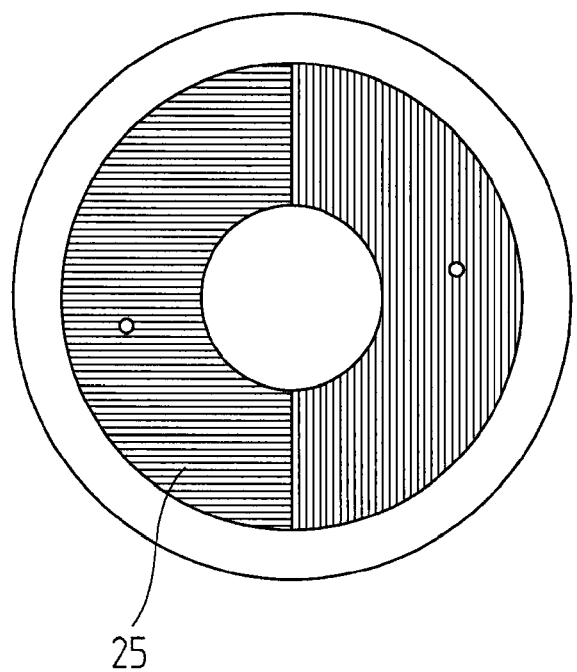
Figure 3:
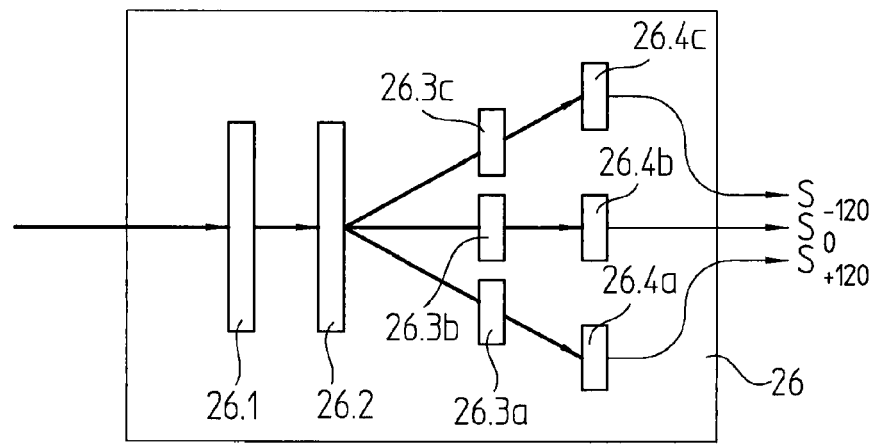
FIG. 3 schematically illustrates the detection unit of the optical position-measuring device illustrated in FIG. 1.
Figure 4:
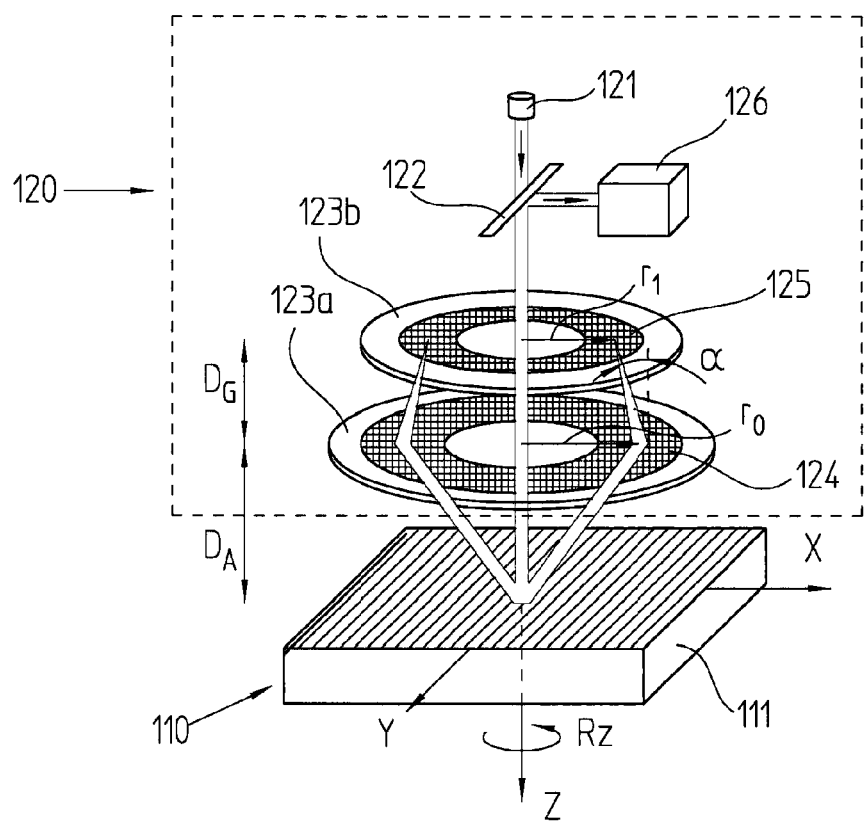
FIG. 4 schematically illustrates an optical position-measuring device according to an example embodiment of the present invention.
Figure 5A:
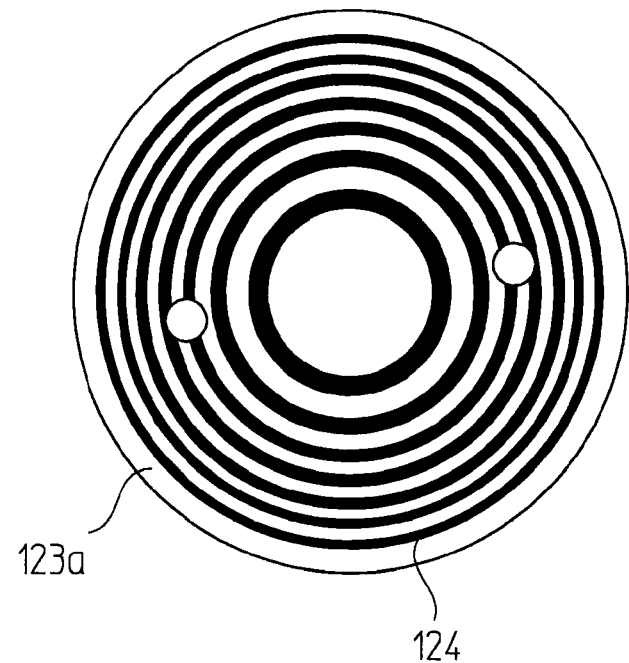
FIGS. 5a and 5b each show a view of components of the optical position-measuring device illustrated in FIG. 4.
Figure 5B:
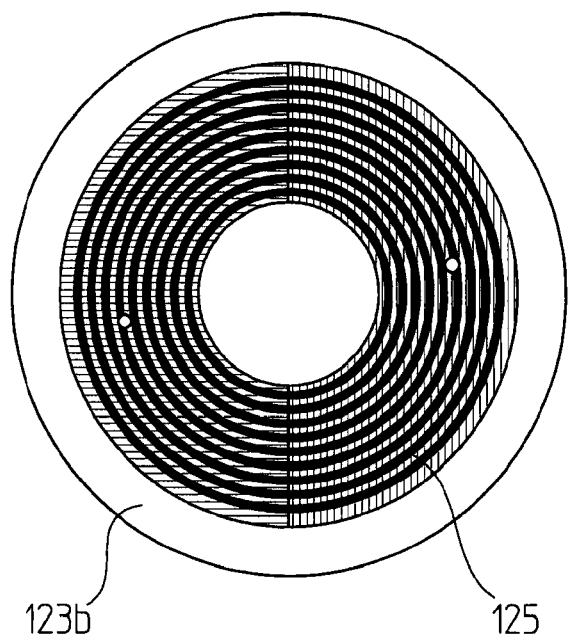

A first example embodiment of the optical position-measuring device is described with reference to FIGS. 1, 2a, 2b and 3. In this context, FIG. 1 shows a highly schematic view of the optical position-measuring device; FIGS. 2a and 2b each show a view of components of the position-measuring device; and FIG. 3 shows a highly schematic representation of the detection unit.

As illustrated in FIG. 1, the optical position-measuring device includes a measuring standard 10 having a measuring graduation 11, as well as a scanning unit 20 that is movable in relation thereto in indicated measuring direction x. In the present exemplary embodiment, measuring graduation 11 is in the form of a reflective measuring graduation. Measuring standard 10 and scanning unit 20 are normally connected to two objects that are mutually displaceable along measuring direction x, for example machine components, whose relative position is to be determined. The scanning signals generated via the position-measuring device are fed to a control unit for further processing, for example to a machine control.

The scanning beam path of the first exemplary embodiment is explained in the following with reference to FIGS. 1, 2a, 2b.

The illuminating beam of a linearly polarized and collimated light source 21 initially passes, undeflected, through a non-polarizing beamsplitter element 22 and is then deflected along an optical axis Z through a central window region of scanning reticle 23 in the direction of measuring standard 10. Linear measuring graduation 11 on the surface of measuring standard 10, whose grating constant, e.g., grating period is denoted in the following by $d_M$, splits the incident beam into two reflected +/−1 diffraction order partial beams of rays. Symmetrically to optical axis Z, the two reflected partial beams of rays then impinge on a transmissive first scanning graduation 24 that is arranged on the front side of scanning reticle 23 and is at a distance $D_A$ from measuring standard 10. Distance $D_A$ is also denoted in the following as scanning distance $D_A$. In this case, the side of scanning reticle 23 facing measuring standard 10 is designated as the front side of scanning reticle 23, and the opposite side of scanning reticle 23 is designated as the rear side. In this exemplary embodiment, first scanning graduation 24 is formed as a transmissive, diffractive ring lens that deflects the two incident partial beams of rays in parallel to optical axis Z and simultaneously focuses them at the rear side of scanning reticle 23. Disposed on the rear side of scanning reticle 23, which has a scanning reticle thickness of $D_G$, is a reflector element 25. Thus, first scanning graduation 24 focuses the partial beams of rays incident thereto at reflector element 25. In the present exemplary embodiment, this is arranged as an annular second scanning graduation in the form of a reflective high-frequency grating that only reflects into the zero diffraction order. The high-frequency grating is used for orthogonally polarizing the two partial beams of rays that are incident thereto, as is explained in greater detail in the following. Apart from that, the high-frequency grating functions optically in the same manner as a mirror, so that the two partial beams of rays incident thereto propagate counter to the original incident beam path, without any beam offset. The two partial beams of rays then again reach first scanning graduation 24 on the front side of scanning reticle 23. Upon passing through the first scanning graduation formed as a diffractive ring lens, the partial beams of rays are recollimated and simultaneously deflected obliquely to optical axis Z. The two partial beams of rays subsequently impinge on measuring standard 10, again as overlapping beams. There, they are reflected after again being diffracted into the +1 and −1 diffraction orders and collinearly superimposed along optical axis Z. Subsequently thereto, the superimposed beam again passes through the inner window region of scanning reticle 23 and is deflected by non-polarizing beamsplitter element 22 toward a detection unit 26. Phase-shifted scanning signals are generated in detection unit 26, as described in detail in the following.

Advantageous possible arrangements, as well as the function of various components of the optical position-measuring device are explained in greater detail in the following.

Light source 21 is preferably arranged as a semiconductor laser diode that emits radiation in the wavelength range of λ=400 nm to 1500 nm. Especially suited as light source 21 is, for instance, a strip waveguide laser diode or a VCSEL light source (vertical cavity surface emitting laser). To avoid measurement error-inducing longitudinal mode hops, the semiconductor laser diode may be operated using current modulation, as is described, for example, in U.S. Patent Application Publication No. 2006/0092428 and German Published Patent Application 10 2004 053 082, each of which is expressly incorporated herein in its entirety by reference thereto. In this case, the modulation frequency may be selected to be higher than the incoming bandwidth of the photovoltaic cell amplifier of detection unit 26, to prevent any corresponding modulation of the scanning signals from occurring. This type of current modulation of the semiconductor laser diode also compensates for any interference from interfering beams. Such interference may arise due to a reflection of illuminating beam at the window regions of scanning reticle 23 or at measuring graduation 11 into the 0 diffraction order. For the same reason, longitudinal and/or transversal multimode semiconductor laser diodes having short coherence lengths of less than 1 mm are preferred as suitable light sources 21 for the optical position-measuring device. In special cases, particularly in the case of small scanning distances $D_A$, and small scanning reticle thicknesses $D_G$, LEDs may also be used as light sources 21.

Normally, a precise measurement instant following triggering of the measurement needs to be defined for position-measuring devices, which, at high traversing velocities of scanning unit 20 and measuring standard 10, are required to provide a high measuring accuracy. A pulsed operation of the semiconductor laser diode may ensure a measurement instant that is precisely determined in time. In addition, a short pulse duration shortens the coherence length of the semiconductor laser diode, making it possible for the pulsed operation to likewise effectively suppress the above mentioned interference from interfering beams.

Reflection phase gratings having a phase depth of approximately 180° and a bar width of approximately $d_M/2$, whose zero order of diffraction is suppressed, are particularly effective as measuring graduations 11 for measuring standard 10. Also advantageous in this case is a quasi-planar configuration of the graduation structures of measuring graduation 11. It should be noted at this point that, alternatively to a reflective measuring graduation, it should be understood that a transmissive measuring graduation may also be used in the optical position-measuring device.

In the present exemplary embodiment of the optical position-measuring device, measuring graduation 11 is configured as a one-dimensional linear graduation. Alternatively, it may also be provided for the measuring graduation to be configured as a two-dimensional linear graduation, as a radial graduation, or as a circular graduation and/or as a combination thereof. Individual instances of these variants are clarified in greater detail in the following description.

First scanning graduation 24 on the front side of scanning reticle 24, which is shown in a plan view in FIG. 2a, features the optical functionality of a diffractive ring lens and is preferably structured as a multistep hologram, e.g., as a transmissive structure in the present example. This also includes the simplest case of a two-step hologram that corresponds to a binary phase grating which has a phase depth of approximately 180° and a local bar width on the order of half of the local grating constant $d_M$.

As the number of steps of such a multi-step hologram increases, so does the diffraction efficiency and thus the attainable signal strength. However, since the outlay for manufacturing also increases, a four-step hologram is a satisfactory compromise. A continuous relief pattern is also fundamentally possible when appropriate production techniques, such as embossing, are available.

The graduation structure of the ring lens of first scanning graduation 24 is defined by a phase function $\Phi_{A1}(r)$ which describes the phase shift of the occurring first diffraction order as a function of distance r to optical axis Z in the case of collimated illumination. In the case that the ring lens is formed as a multi-step hologram, phase function $\Phi_{A1}(r)$ is approximated by a step function; each step of this function corresponding to a relief height. The implicit condition that phase function $\Phi_{A1}(r)$ be only dependent on radius r is satisfied by the cylindrical symmetry of this diffractive ring lens.

To optimally select phase function $\Phi_{A1}(r)$, numerical optimization methods may be used, for example. To this end, phase function $\Phi_{A1}(r)$ is initially described using optimization parameters an (n=1, 2, ... N). For example, a polynomial formulation yields $$\phi_{A1}(r) = \sum_{n=1}^{N} a_n \cdot r^n \qquad \text{(Eq. 1)}$$

Ideally, a partial beam of rays having an ideal wavefront would have to emerge in each case from the diffractive ring lens that produces a diffraction-limited focus at the rear side of scanning reticle 23. Such an ideal wavefront $\Phi_{ideal}(x,y)$ is expressed by $$\phi_{ideal}(x, y) = \frac{2\pi}{\lambda} \cdot n_G \cdot \left( \sqrt{(x-x_F)^2 + (y-y_F)^2 + D_G^2} - D_G \right) \qquad \text{(Eq. 2)}$$

where $n_G$ represents the refractive index of the scanning reticle, $(x_F, y_F)$ represents the desired lateral focus location, and $D_G$ represents the thickness of the scanning reticle.

In this exemplary embodiment, desired lateral focus location (xF, yF) is identical to the point of impingement of the principal ray of the particular partial beam of rays on a first scanning graduation 24. For the optimization process, the coordinate system may be selected without limitation in a manner that allows measuring graduation 11 to deflect in the x direction, so that the following relationship is satisfied:

$$(x_F, y_F) = (r_0, 0) \qquad \text{(Eq. 3)}$$

In this case, radius $r_0$ denotes the radial distance of the principal ray impinging on the diffractive ring lens and is given by the diffraction at the measuring graduation as follows:

$$r_0 = \frac{\frac{\lambda}{d_M}}{\sqrt{1 - \left(\frac{\lambda}{d_M}\right)^2}} \cdot D_A \qquad \text{(Eq. 4)}$$

where $D_A$ represents the scanning distance.

In comparison to ideal wavefront $\Phi_{ideal}(x,y)$ wavefront aberration $\delta\Phi_{A1}(x,y)$ of the wavefront emerging from the diffractive ring lens is then calculated as:

$$\delta\phi_{A1}(x, y) = \frac{2\pi}{d_M} \cdot x + \phi_{A1}\left(\sqrt{x^2 + y^2}\right) - \phi_{ideal}(x, y) \qquad \text{(Eq. 5)}$$

In this case, the first term in Equation 5 describes the wavefront of the incident partial beam of rays following the diffraction at measuring graduation 11. It is intended that this wavefront aberration be minimized in the field around the beam center $(r_0, 0)$ by properly selecting optimization parameters a1, a2, ... aN:

$$\delta\phi_{A1}(r_0 + \Delta x, \Delta y)|^2 \rightarrow \text{Min} \qquad \text{(Eq. 6)}$$

Such a numerical optimization is readily possible for one skilled in the art. The optimization may be refined by introducing additional requirements. Thus, a simultaneous minimization of wavefront aberrations, for example, may be introduced at specific tolerances of the optical position-measuring device.

However, besides the numerical optimization outlined here, there is also a very effective and simple analytical approach for the above described optimization when the following additional condition is met:

$$D_G = \frac{d_M \cdot n_G \cdot r_0}{\lambda} \qquad \text{(Eq. 7)}$$

Under this condition, an optimal approach is expressed as $$a_2 = -\frac{\pi}{d_M \cdot r_0}, \, a_n = 0 (\text{for all } n \neq 2) \qquad \text{(Eq. 8)}$$

Thus, together with Equation 1, the optimized phase function of the diffractive ring lens is calculated:

$$\phi_{A1}(r) = -\frac{\pi}{d_M \cdot r_0} \cdot r^2 \qquad \text{(Eq. 9)}$$

The wavefront aberration according to Equation 5 is expressed as:

$$\delta\phi_{A1}(r_0 + \Delta x, \Delta y) = \qquad \text{(Eq. 10)}$$

$$-\frac{\pi}{d_M \cdot r_0} \cdot (\Delta x^2 + \Delta y^2) - \frac{2\pi}{\lambda} \cdot n_G \cdot \sqrt{\Delta x^2 + \Delta y^2 + D_G^2}$$

Expanded as a polynomial in $\Delta x$ and $\Delta y$, the result for the lowest-order polynomial is:

$$\delta\phi_{A1}(r_0 + \Delta x, \Delta y) \approx +\frac{\pi \cdot n_G}{4 \cdot \lambda \cdot D_G^3} \cdot (\Delta x^2 + \Delta y^2)^2 \qquad \text{(Eq. 11)}$$

The meaning of Equation 9 is that all third-order polynomials, such as coma aberrations, are eliminated. Fourth-order polynomials, such as spherical aberrations, arise. Following the second diffraction at the diffractive ring lens, the remaining small wavefront aberration of this approach results again in very efficiently collimated partial beams of rays which, following the second diffraction at measuring graduation 11, and measuring standard 10, are virtually ideally superimposed and thus deliver particularly strong scanning signals. The installation, operating and manufacturing tolerances are also thereby maximized.

Inserting Equation 4 into Equations 7 and 8, one obtains:

$$D_G = \frac{n_G \cdot D_A}{\sqrt{1-\left(\frac{\lambda}{d_M}\right)^2}}, \quad a_2 = -\frac{\pi \cdot \sqrt{1-\left(\frac{\lambda}{d_M}\right)^2}}{\lambda \cdot D_A} \qquad \text{(Eq. 12)}$$

Since, in most cases, grating period $d_M$ of measuring graduation 11 is much larger than wavelength $\lambda$, the two parameters $D_G$ and $a_2$ are hardly dependent on grating period $d_M$. This means then when such a scanning optics is used, measuring graduations 11 having different grating periods $d_M$ may be scanned perfectly well. This feature, along with the very high tolerance to Moiré tilt-angle variations, make it possible to derive other possible applications, as is explained in the following.

FIG. 2b is a schematic plan view of reflector element 25, and of the second scanning graduation on the rear side of scanning reticle 23. In the present example, the second scanning graduation is annular in shape in the same manner as first scanning graduation 24. However, a reflective high-frequency grating having a local grating constant of preferably smaller than $\lambda/n_G$ is provided as second scanning graduation. This ensures that, at a virtually normal incidence of the two partial beams of rays on the second scanning graduation, only a zero order of diffraction may arise. Thus, the high-frequency grating initially acts as a mirror to the partial beams of rays incident thereto. At this point, the grating structure of this high-frequency grating is selected in a manner that allows different polarization properties for the partial beams of rays it reflects to be obtained as a function of the local grating direction or grating form, such as bar height and bar width.

Thus, it is possible to vary these grating parameters as a function of location to likewise make the polarization properties location-dependent. In the illustrated example embodiment, two halves of an annular high-frequency grating having mutually orthogonal grating directions are provided in accordance with FIG. 2b. The grating bars are formed as metallic bars and act as linear polarizers. Only the polarization direction is reflected in parallel to the grating bars in each case. As indicated in FIG. 2b, the two partial beams of rays each impinge upon one of the two halves of the high-frequency grating. Since the polarization direction of the incident beam is selected to be less than 45° to both grating directions, the two partial beams of rays are thereby mutually orthogonally polarized. Accordingly, the high-frequency grating of reflector element 25, e.g., reflector element 25 functions in this example as an optical polarization component.

Detection unit 26 of the first exemplary embodiment is shown in schematic form in FIG. 3. The superimposed beam, which is incident thereto from the left, first impinges on a $\lambda/4$ retardation plate 26.1 which converts the linear polarization of the two orthogonally polarized partial beams of rays into a right-handed and left-handed circular polarization. A downstream beamsplitter 26.2 in the form of a grating beamsplitter spatially splits the superimposed beam into three 0 and +/−1 diffraction order superimposed partial beams of rays. These subsequently propagate through three polarizers 26.3a, 26.3b, 26.3c and finally impinge on three detector elements 26.4a, 26.4b, 26.4c. Detector elements 26.4a, 26.4b, 26.4c deliver scanning signals $S_0$, $S_{-120}$, and $S_{+120}$. By rotating each of the three polarizers 26.3a, 26.3b, 26.3c by 60° in relation to each other, a mutual phase shift of 120° of scanning signals $S_0$, $S_{-120}$, and $S_{+120}$ is attained in each case. Phase-shifted scanning signals $S_0$, $S_{-120}$, and $S_{+120}$ are then further processed in a suitable sequential electronics in, e.g., a generally conventional manner.

The tolerance to Moiré tilt-angle variations of this example embodiment of the optical position-measuring device is limited by reflector element 25 and by the second scanning graduation provided for this purpose. Since the focus of the two partial beams of rays must remain in each case on one half of the high-frequency grating in order to always ensure a defined linear and mutually orthogonal polarization, a tolerance to Moiré tilt-angle variations of nearly +/−90° is attainable. Except for the polarizing action, the behavior of the second scanning graduation is analogous to that of a mirror. If the beam geometry of the scanning optics is understood to be merely the position and direction of the beam path, not, however, the polarization state of the partial beams of rays, then the beam geometry of the present scanning optics, from the splitting of the two partial beams of rays to the superimposition thereof, is completely cylindrically symmetric.

Second Example Embodiment

A second example embodiment of the optical position-measuring device is described with reference to FIGS. 4, 5a, 5b and 6. In this case, merely the relevant differences from the first exemplary embodiment are discussed in detail.

In this variant of the optical position-measuring device, first scanning graduation 124 is formed as a transmissive, diffractive ring lens which at this point, however, causes the partial beams of rays emerging following the first traversal to be radially deflected by an angle α relative to the normal direction. The foci of the two partial beams of rays lie once more on reflector element 125, which, in turn, is arranged as second scanning graduation. Due to angle α, radial distance $r_1$ of the foci from optical axis Z is not identical to radial distance $r_0$ of partial beams of rays on first scanning graduation 124. Thus, besides the orthogonal polarization, the second scanning graduation must induce a radial deflection of the partial beams of rays to enable them to counter-propagate again. This additional radial deflection is achieved in that the high-frequency grating of the second scanning graduation bears a superimposed circular grating structure having circular bars. To this end, radial grating constant $d_R$ of the circular grating is selected as follows:

$$d_R = \frac{\lambda}{2 \cdot \sin(\alpha)} \quad \text{(Eq. 13)}$$

Moreover, in the second scanning graduation of the present example embodiment of the optical position-measuring device, the high-frequency grating is configured to function locally as a $\lambda/4$ retardation plate whose orientation is given by the local grating direction of the high-frequency grating. As in the first exemplary embodiment, this orientation is selected to be mutually orthogonal in both halves of the second scanning grating, so that the incident partial beams of rays, which, as in the case of the illumination beam, are linearly polarized to less than 45° to both grating directions, are converted into a left-handed circularly and a right-handed circularly polarized partial beam of rays.

The high-frequency grating is preferably made of a highly refractive dielectric material that is covered by a planar interference mirror layer or a planar metal mirror. An exemplary description of a suitable high-frequency grating is set forth, for example, in the publication Wanji Yu et al., "Reduced Wavelength-Dependent Quarter-Wave Plate Fabricated by a Multilayered Subwavelength Structure," Appl. Optics, Vol. 45, No. 12, p. 2601ff, 2006.

Since, in this case, the high-frequency grating does not act as a polarizer that absorbs or transmits a polarization direction, rather as a retardation plate, the reflected light intensity and thus also the signal strength are increased.

Figure 6:
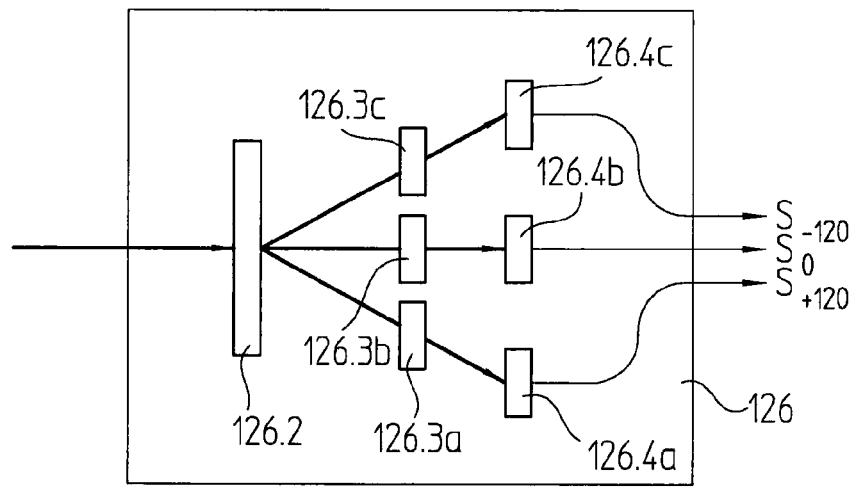
FIG. 6 schematically illustrates the detection unit of the optical position-measuring device illustrated in FIG. 4.

In this example, the need for the input-side $\lambda/4$ retardation plate from the preceding exemplary embodiment may be eliminated in detection unit 126 illustrated in FIG. 6, since the two partial beams of rays are already orthogonally circularly polarized. Apart from that, the configuration of detection unit 126 corresponds to that of the first exemplary embodiment.

In the present second exemplary embodiment, the two scanning gratings are separately affixed to two separate scanning plates 123a, 123b and separated by an air gap. During assembly of the position-measuring device, this air gap is adjusted such that maximum signals strengths result. This makes it possible to compensate for component tolerances, such as the wavelength variation of the light source, for example.

The beam geometry of the scanning optics of the second exemplary embodiment is again cylindrically symmetric from the splitting of the two partial beams of rays to the superimposition thereof. The attainable tolerance to Moiré tilt-angle variations again is nearly +/−90°.

Third Example Embodiment

Figure 7:
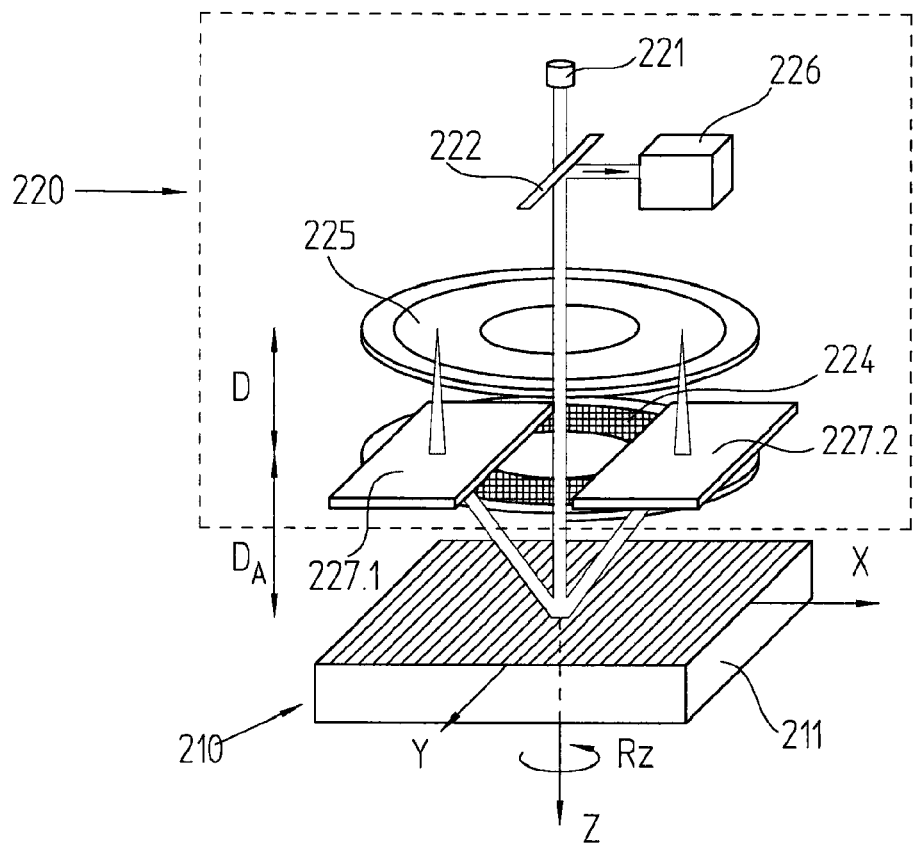
FIG. 7 schematically illustrates an optical position-measuring device according to an example embodiment of the present invention.
Figure 8:
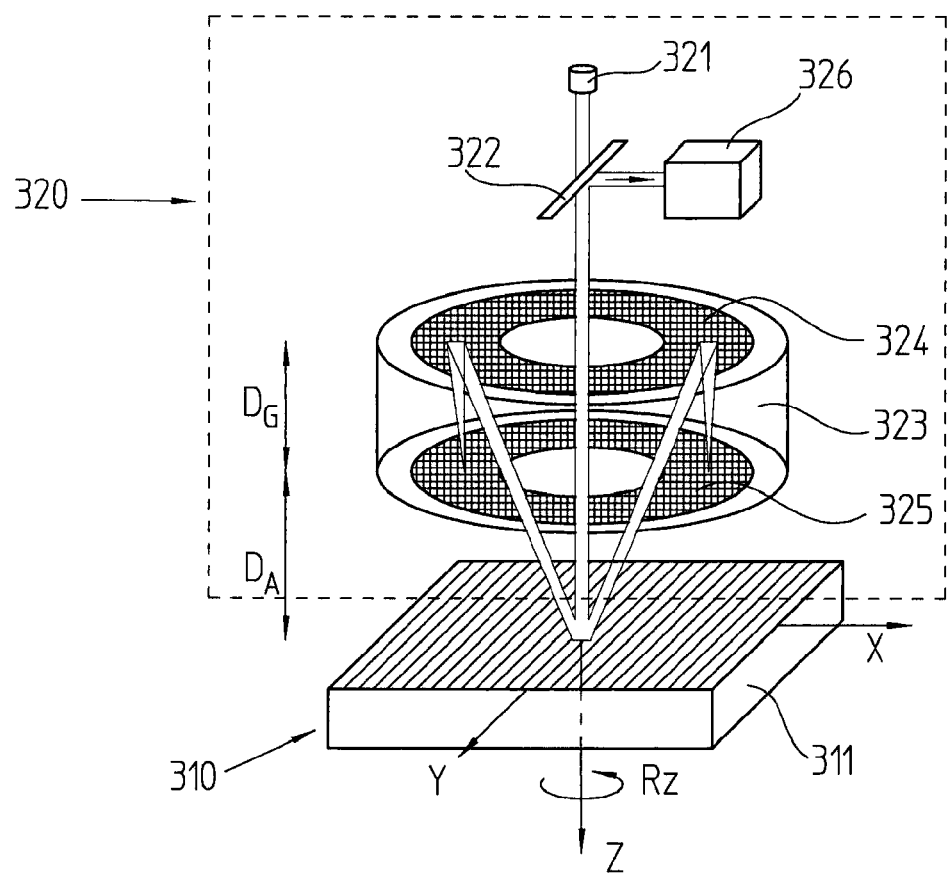
FIG. 8 schematically illustrates an optical position-measuring device according to an example embodiment of the present invention.

Analogously to the previous illustrations, FIG. 7 shows a third example embodiment of the optical position-measuring device.

It is provided, in turn, for first scanning graduation 224 to be formed as a transmissive, diffractive ring lens. As in the first exemplary embodiment, the partial beams of rays emerging upon the first passage through the ring lens, are deflected in parallel to optical axis Z ($\alpha=0$). They subsequently pass in each instance through a $\lambda/8$ retardation plate 227.1, 227.2 before impinging on reflector element 225 that is constructed as a mirror in the present case. In this example embodiment of the optical position-measuring device, the combination of $\lambda/8$ retardation plate 227.1, 227.2 and the mirror replaces the second scanning graduation from the first two exemplary embodiments.

The linear polarization of the beam emitted by light source 221 and the two $\lambda/8$ retardation plates 227.1, 227.2 are oriented to one another such that the two partial beams of rays, after passing twice through $\lambda/8$ retardation plates 227.1, 227.2, exhibit a left-handed circular and a right-handed circular polarization, respectively, and thus are thereby mutually orthogonally polarized. The configuration of detection unit 226 corresponds to the second exemplary embodiment in accordance with FIG. 6.

This example embodiment of the position-measuring device is particularly advantageous when it is not possible to manufacture complex high-frequency gratings for the second scanning grating in order to properly adjust the polarization directions. Instead, commercial $\lambda/8$ retardation plates 227.1, 227.2, made of quartz crystals, for example, are used for the desired orientation of the polarization directions in both partial beams of rays. Thus, in this exemplary embodiment, retardation plates 227.1, 227.2 function as optical polarization components in order to suitably adjust the polarization directions in the paths of the split partial beams of rays. Alternatively to the configuration of retardation plates 227.1, 227.2 between first scanning graduation 224 and reflector element 225, it could also be provided for retardation plates 227.1, 227.2 to be positioned between measuring graduation 211 and first scanning graduation 224 in the beam paths of the split partial beams of rays.

Fourth Example Embodiment

A fourth exemplary embodiment of the optical position-measuring device is illustrated in FIGS. 8, 9a, 9b, and 10.

In contrast to the previously discussed examples, in this example embodiment, first scanning graduation 224 is affixed to the rear side of scanning reticle 223; and reflector element 25 and second scanning graduation are affixed to the front side of scanning reticle 223. In this connection, both first scanning graduation 224, as well as the scanning graduation of reflector element 225 are used in the reflection. These scanning graduations are thereby very effectively protected from contamination caused by fingerprints or water condensation, for example. This considerably enhances the insensitivity of the position-measuring device to contamination.

Figure 9A:
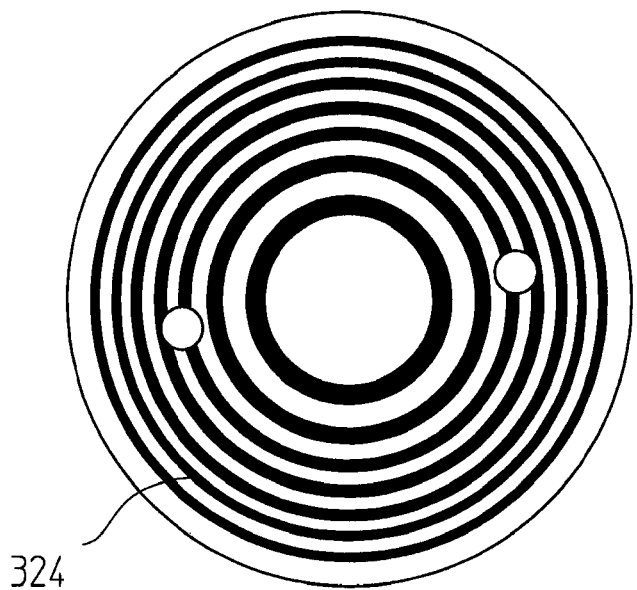
FIGS. 9a and 9b each show a view of components of the optical position-measuring device illustrated in FIG. 8.
Figure 9B:
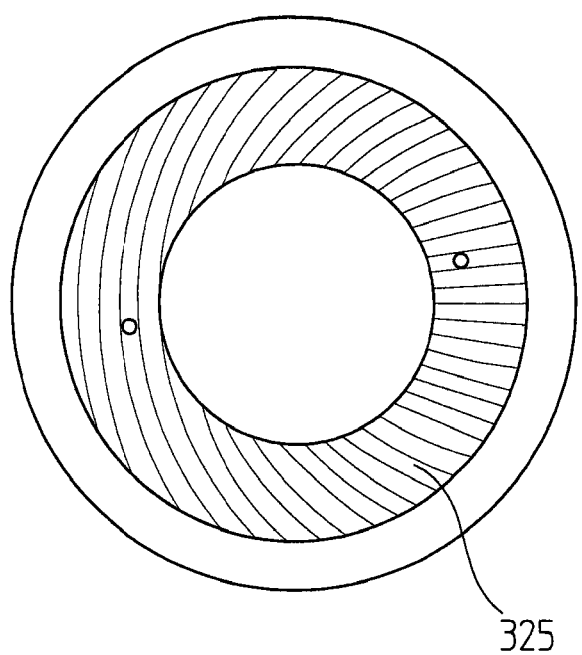

The collimated illumination beam from light source 321 is circularly polarized in this case by a $\lambda/4$ retardation plate and initially propagates through beamsplitter 322 and then the inner window region of scanning reticle 223. The beam is subsequently split by measuring graduation 311 on measuring standard 310 into two +/−1 diffraction order partial beams of rays. Via the inner window region of the front side of scanning reticle 323, the two partial beams of rays reflected by measuring graduation 311 subsequently reach the reflecting first scanning graduation 324 on the rear side of scanning reticle 323. First scanning graduation 324, shown in a plan view in FIG. 9a, is again configured as a diffractive ring lens. Once diffracted by first scanning graduation 324, the two partial beams of rays are focused in parallel to optical axis Z at reflector element 325, by the likewise reflective second scanning graduation at the front side of scanning reticle 323. The annular second scanning graduation, which is shown in FIG. 9b, is again configured as a reflective metallic high-frequency grating. The polarizing effect of the high-frequency grating induces a linear polarization in each of the partial beams of rays reflected into the 0 order of diffraction. The orientation thereof is again determined by the local direction of the grating bars of the high-frequency grating. As illustrated in FIG. 9b, the local bar direction continuously rotates by 180° along the azimuthal extent. Grating phase ΦP(x,y), which is taken as a basis, may be formed in accordance with the following relationship:

$$\phi_P(x,y) = \frac{2\pi}{d_p} \cdot \left(r_1 + \sqrt{x^2+y^2}\right) \cdot \sin\left(\frac{\arctan 2(y,x)}{2}\right) \quad \text{(Eq. 14)}$$

where $r_1=r_0$ represents the radius of the foci of the two partial beams of rays on the second scanning graduation, $d_P$ represents the local grating constant of the high-frequency grating, and arctan 2 represents the extended arctan function.

In this context, at diametrically opposing locations, the local bar directions are mutually orthogonal—at least at radius $r_1$. Since at any given Moiré tilting Rz of measuring standard 310, the two component beams impinge exactly at such diametral locations, they are always polarized mutually orthogonally. However, in response to a Moiré tilting Rz, the polarization of both partial beams of rays co-rotates by half of the angle, so that a special detection unit 326 is required for generating suitable scanning signals.

Figure 10:
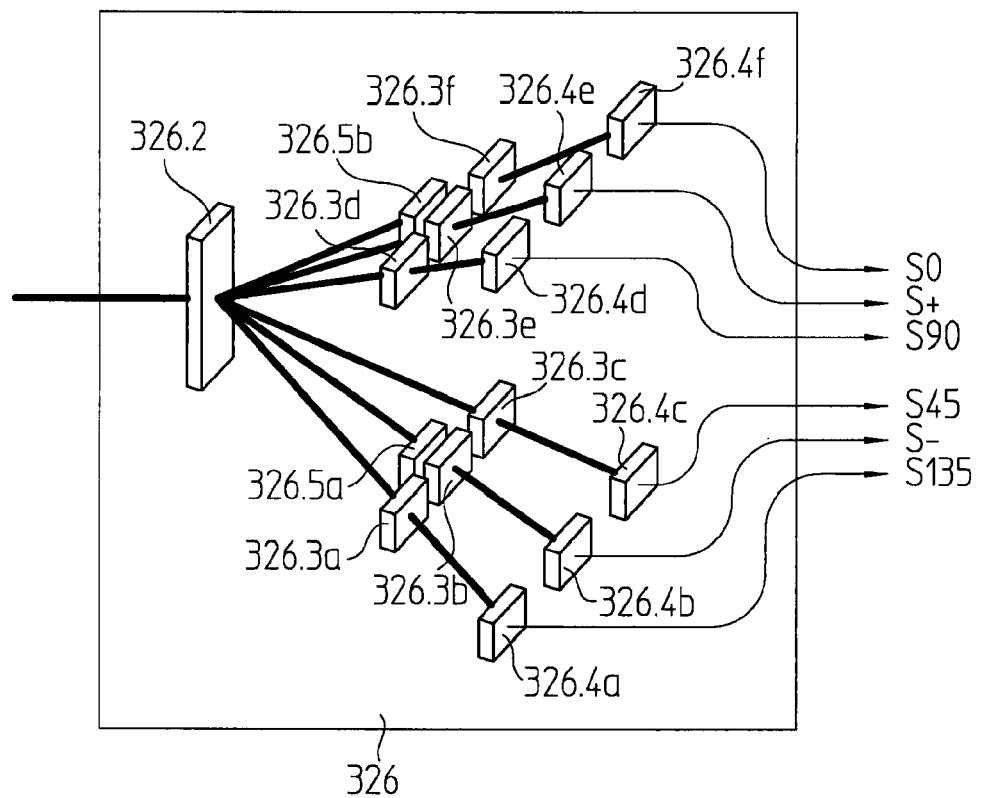
FIG. 10 schematically illustrates the detection unit of the optical position-measuring device illustrated in FIG. 8.

The basic configuration of such a detection unit is schematically illustrated in FIG. 10. In this example embodiment of the position-measuring device, a cross grating 326.2 is used in detection unit 326 for splitting the incident superimposed beam into six superimposed partial beams of rays. Each of these superimposed partial beams of rays propagates through a polarizer 326.3a to 326.3f before impinging on a detector element 326.4a to 326.4f and being converted into a scanning signal. In addition, in the case of two of the superimposed partial beams of rays, a λ/4 retardation plate 326.5a, 326.5b is to be installed upstream of polarizer 326.3b, 326.3e. The Poincaré representation of a polarization state is referred to throughout the further description, which is described, for example, in the textbook M. Born, E. Wolf: Principles of Optics, Cambridge University Press, 1999; pp. 32, 33. The orientations of polarizers 326.3b, 326.3e and of λ/4 retardation plates 326.5a, 326.5b are selected in a manner that allows the following states to be detected by detector elements 326.4a to 326.4f in the Poincaré representation of the polarization state of the superimposed beam:

linear polarizations: S0: 0°, S45: 45°, S90: 90°, S135: 135°;
circular polarizations: S+: left-handed circular,
S− right-handed circular.

In this manner, each polarization state of the superposed beam may be detected which, in the Poincaré representation, corresponds to an exact localization on the Poincaré sphere.

The positional phase may be determined by properly analyzing the six scanning signals for every Moiré tilt angle Rz. Therefore, this example embodiment may be provided without limiting Moiré tilting Rz. However, an ambiguity in measuring direction x is to be clarified upon initial operation of this configuration of the optical position-measuring device. Since the positive and negative diffraction directions of measuring graduation 310 are indistinguishable, additional information is needed to define the algebraic sign of measuring direction x. To this end, additional signals may be generated, for instance, or suitable information from other sources may be analyzed. Upon initial operation, selected measuring direction x may also be retained in the case of any given Moiré tilting Rz.

Fifth Example Embodiment

Figure 11:
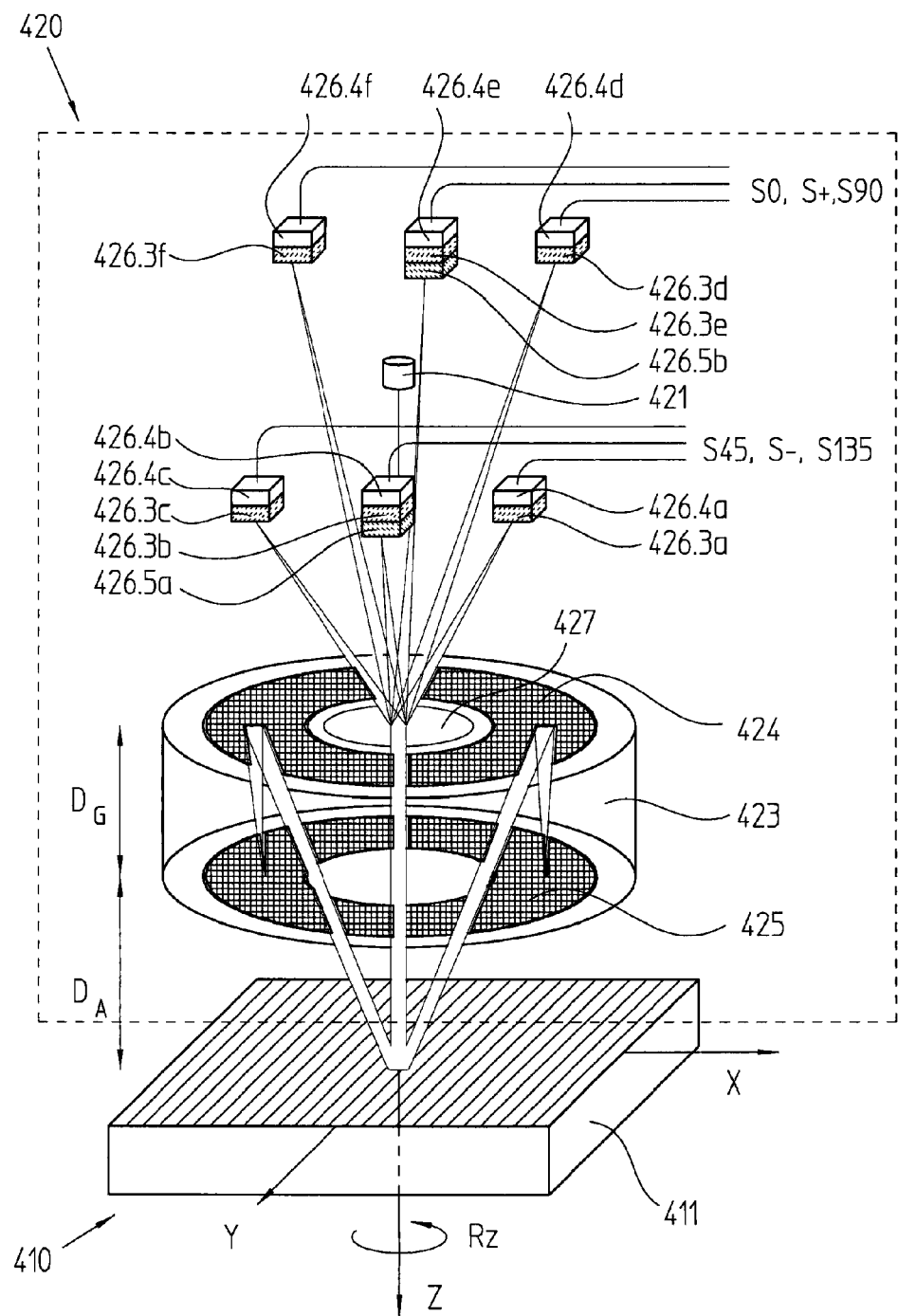
FIG. 11 schematically illustrates an optical position-measuring device according to an example embodiment of the present invention.
Figure 12:
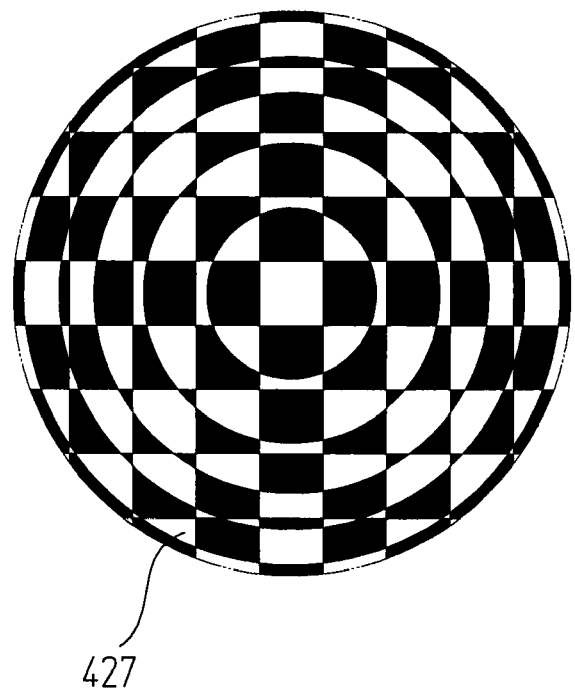
FIG. 12 shows a view of a component of the optical position-measuring device illustrated in FIG. 11.

The fifth exemplary embodiment of the optical position-measuring device substantially corresponds to the previously explained fourth example embodiment and is illustrated in FIGS. 11 and 12.

A diffractive structure 427 having a lens function is used for collimating the beam emitted by light source 421. In this case, structure 427 is located in the region on the top side of scanning reticle 423 through which the beam emitted by light source 421 passes. Specifically, in this example, structure 427 is inserted inside of the diffractive ring lens of first scanning graduation 424 on the top side of scanning plate 423. Diffractive structure 427 collimates the divergently incident beam of rays of light source 421. Another optical functionality is also implemented via diffractive structure 427. Thus, it functions simultaneously as a grating beamsplitter in the form of a cross grating and splits the superimposed beam counter-propagating from measuring graduation 411 into six superimposed partial beams of rays. The phase grating structure of diffractive structure 427 is schematically shown as a two-step hologram in FIG. 12. Discernible in this representation is the annular Fresnel lens that is superimposed by a checkerboard-patterned field array in which the local structure of the Fresnel lens is inverted. The partial beams of rays, which are superimposed in response to the second diffraction at measuring graduation 411 and emerge along optical axis Z, are split by diffractive structure 427 into six superimposed partial beams of rays and simultaneously focused. This permits the use of smaller detector elements 426.4a to 426.4f which, in turn, allows for a compact design. In addition, the superimposed partial beams of rays are deflected by optical axis Z and thus separated from the illuminating beam from light source 421. Therefore, diffractive structure 427 also serves as a beamsplitter.

As in the fourth exemplary embodiment, optical polarization components in the form of polarizers 426.3a to 426.3f and λ/4 retardation plates 426.5a, 426.5b upstream of detector elements 426.4a to 426.4f are used for generating scanning signals S0, S45, S90, S135, S+ and S−.

In comparison to the fourth example embodiment, the fifth example embodiment of the optical position-measuring device renders possible a distinctly more compact type of construction. Instead of combined diffractive structure 427, it should be understood that separate, diffractive components may also be alternatively used for the collimation lens and the splitting grating in the collimation and beam splitting processes.

Sixth Example Embodiment

Figure 13:
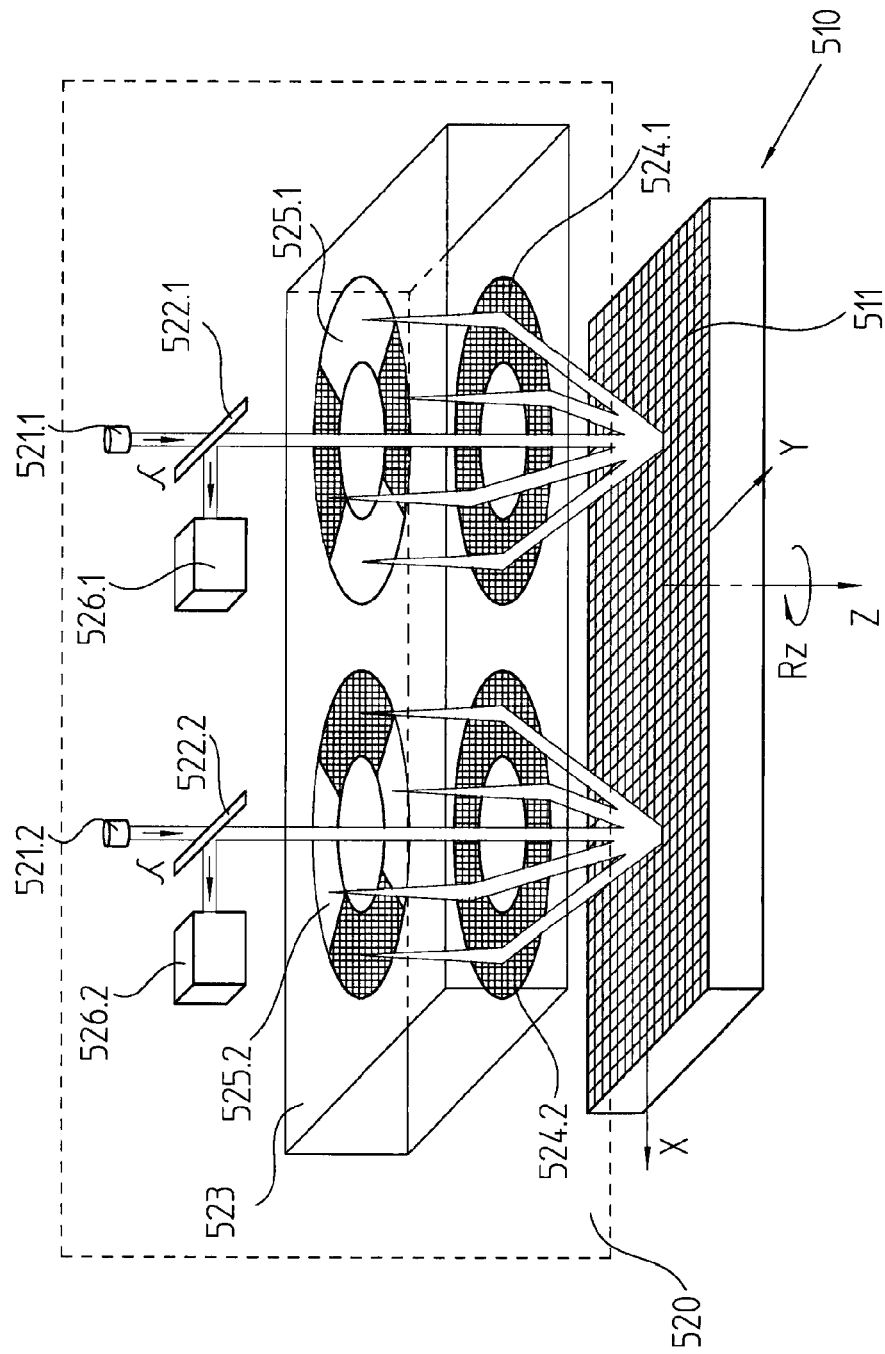
FIG. 13 schematically illustrates an optical position-measuring device according to an example embodiment of the present invention.
Figure 14:
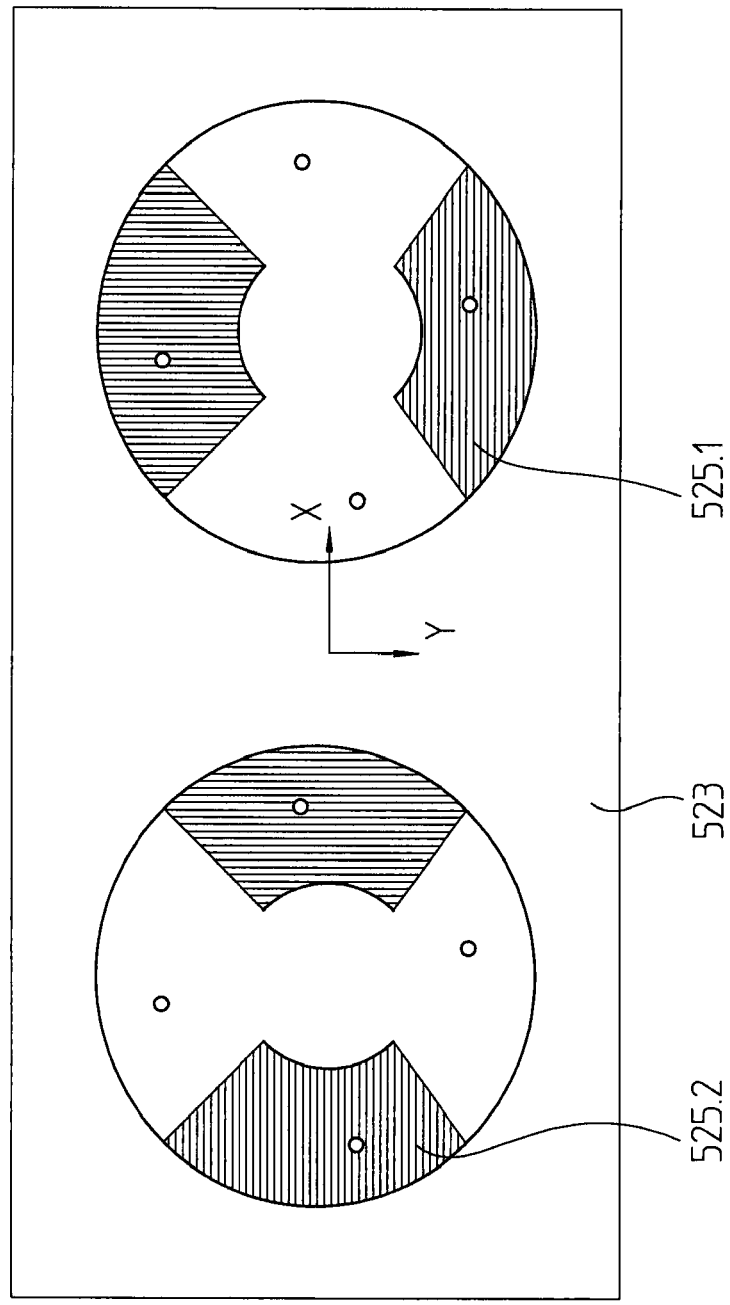
FIG. 14 shows a view of a component of the optical position-measuring device illustrated in FIG. 13.

A sixth example embodiment of the optical position-measuring device is shown in FIGS. 13 and 14.

This example embodiment provides for the scanning of a measuring standard 510, in the case of which reflective measuring graduation 511 located thereon is formed as a cross grating, i.e., as a two-dimensional linear graduation. The cross grating has the same grating periods in the indicated x and y directions and may be configured as a phase grating having a 180° phase deviation in a checkerboard pattern. On the part of scanning unit 520, two virtually identical scanning optics may be provided similarly to the first described exemplary embodiment. First scanning graduations 524.1, 524.2 and reflector elements 525.1, 525.2 are affixed to the two opposing sides of a common scanning reticle 523. At each scanning point, measuring graduation 511 diffracts the incident illumination beam from light sources 521.1, 521.2 in each instance into four first diffraction orders which are denoted by two indices for the x, respectively y directions: (1,0), (−1,0), (0,1), (0,−1). All four first diffraction orders are focused in each instance at the rear side of scanning reticle 523 by first scanning grating 524.1, 524.2 formed as a diffractive ring lens on the front side of scanning reticle 523. In contrast to the first example embodiment, reflector elements 525.1, 525.2 configured as second scanning graduations are bounded in the shape of sectors. As illustrated in FIG. 14, each scanning point has two diametrically opposing sectors of respective reflector element 525.1, 525.2 assigned thereto, which each contain a high-frequency grating whose grating bars extend mutually orthogonally, as illustrated in FIG. 14. Therefore, in the case of each scanning point, only those diametrically opposing partial beams of rays are reflected which impinge on one of the two sectors. The sectors of the two scanning points are mutually angularly offset by 90°, so that, at the first scanning point, only the diffraction orders (1,0) and (−1,0) of the measuring graduation are reflected; and, at the second scanning point, only the diffraction orders (0,1) and (0,−1) are deflected in the y direction. This ensures that the first scanning point only measures in the x direction, and the second scanning point only in the y direction. The maximum angular opening of the sectors of the second scanning graduation is 90°, and it permits a maximum tolerance to Moiré tilt-angle variations of nearly +/−45°.

Seventh Example Embodiment

Figure 15:
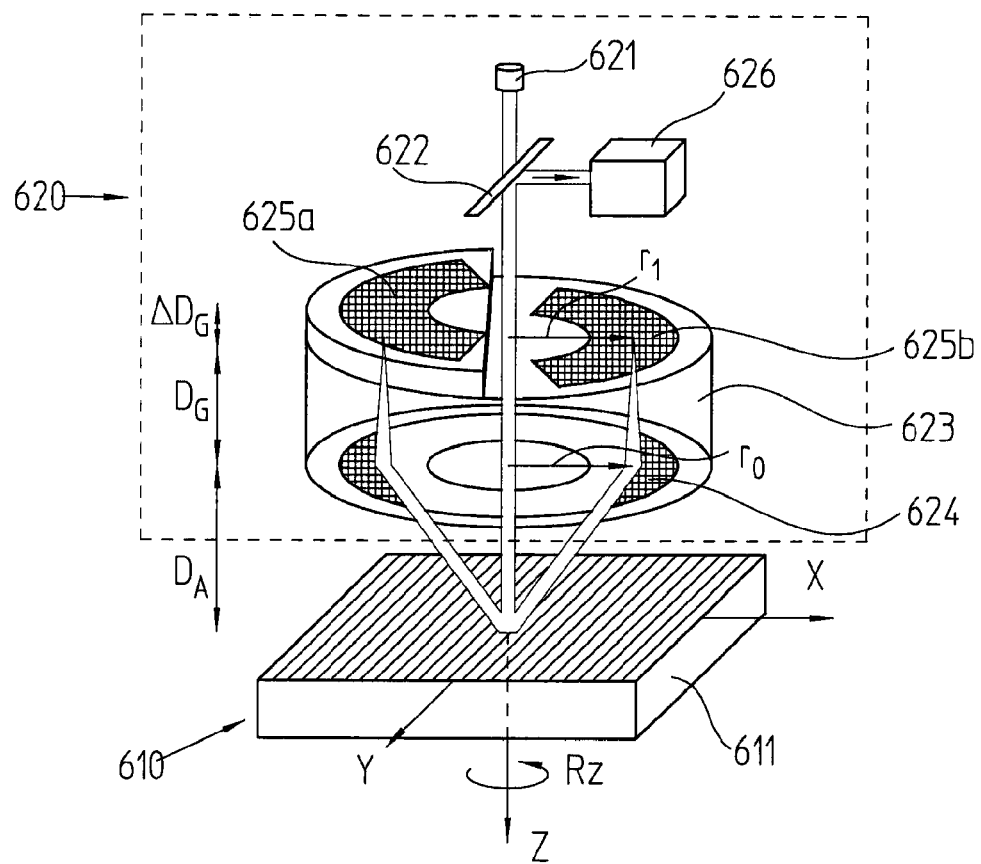
FIG. 15 schematically illustrates optical position-measuring device according to an example embodiment of the present invention.
Figure 16:
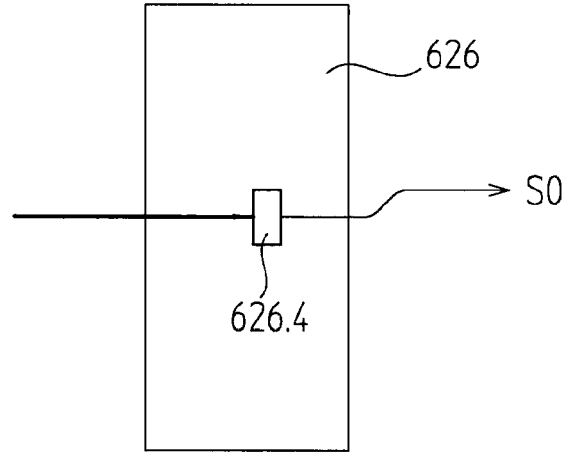
FIG. 16 shows a view of a component of the optical position-measuring device illustrated in FIG. 15.
Figure 17:
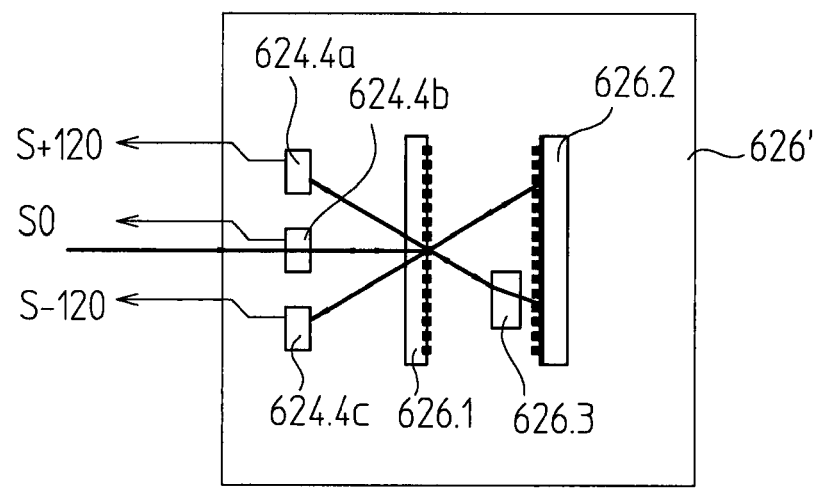
FIG. 17 schematically illustrates a component of a variant of the optical position-measuring device illustrated in FIG. 15.

A seventh example embodiment of the optical position-measuring device is illustrated in FIGS. 15 and 16. FIG. 17 shows a component of a first variant of this example embodiment of the optical position-measuring device.

In this example embodiment, an optical delay line is inserted into the beam path of one of the two split component beams. As shown in FIG. 15, the two reflector elements 625a and 625b for the two component beams are not located in the same plane, but rather are displaced relative to each other by a small amount $\Delta D_G$ along the optical axis in the z direction. Accordingly, scanning graduation 624 is divided into two halves which each focus the corresponding partial beams of rays at reflector elements 625a, respectively 625b. As a result of these measures, the two partial beams of rays propagate through optical paths of different lengths that differ by amount $n_G \cdot \Delta D_G$, $n_G$ representing the refractive index of scanning reticle 623, and $\Delta D_G$ the thickness thereof. Phase shifts thereby result upon interference of the partial beams of rays that are dependent on the wavelength of light source 621. In this instance, an orthogonal polarization of the two partial beams of rays is no longer necessary.

Corresponding detection unit 626 of this example embodiment is schematically illustrated in FIG. 16. It includes only one detector element 626.4 which generates scanning signal S0. Phase-shifted scanning signals required for discerning direction in the position-measuring device are obtained by properly modulating the wavelength of light source 621. The publication by Susumu Makinouchi et al, "An Evaluation of a Modulated Laser Encoder," Prec. Eng. 35 (2011) 302-308 describes the basic principle of this type of generation of phase-shifted scanning signals. In this case, light source 621 is high-frequency wavelength-modulated, thereby resulting in a corresponding phase modulation of scanning signal S0. It is analyzed by a subsequent evaluation electronics and delivers the information required for discerning direction. Modulating the wavelength of a semiconductor laser diode is especially simple in that the current source thereof is modulated.

The above mentioned publication provides a detailed description of the evaluation of scanning signal S0.

In this example embodiment of the optical position-measuring device, it is especially beneficial when an optical fiber connection, e.g., an optical waveguide is introduced between light source 621, beamsplitter 622 and detection unit 626, on the one hand, and scanning reticle 623, on the other hand. In this context, one single optical fiber is capable of transmitting the light beam from light source 621 to scanning reticle 623 and, simultaneously, the two superimposed partial beams of rays from the scanning reticle 623 back to detection unit 626. At this point, both a single-mode, as well as a multimode fiber are suited as an optical fiber.

It is also advantageous for beamsplitter 622 to be arranged as a polarizing beamsplitter and for the linear polarization of light source 621 to be selected in a manner that permits attenuation of the beam from light source 621 without attenuation by beamsplitter 622. A λ/4 retardation plate, which circularly polarizes the beam propagating therethrough, is positioned in the beam path downstream of polarizing beam splitter 622. The superimposed partial beams of rays counter-propagating from scanning reticle 623 toward this λ/4 retardation plate are oppositely circularly polarized and converted by the λ/4 retardation plate into a linear polarization state that is orthogonal to the polarization of the beam emitted by light source 621. This beam is reflected by polarizing beamsplitter 622 without attenuation toward detection unit 626. The signal strength of the optical position-measuring device is thereby optimized, and the signal noise is minimized.

A first variant of the seventh example embodiment of the optical position-measuring device may be provided on the basis of the priciples described in PCT International Published Patent Application No. WO 2011/000715, which is expressly incorporated herein in its entirety by reference thereto. A light source having a very short coherence length, such as an LED, for example, or a superluminescent diode that is no longer wavelength-modulated may preferably be used, for example. In this case, the coherence length of the selected light source should be shorter than optical delay line $n_G \cdot \Delta D_G$. A detection unit 626' for this variant of the optical position-measuring device is schematically illustrated in FIG. 17. A beamsplitter 626.1 in the form of a grating splits the two incident, superimposed partial beams of rays into two secondary, likewise superimposed partial beams of rays. Both are reflected in each instance at a grating 626.2, that is rigidly connected to beamsplitter 626.1, and counter-propagate toward beamsplitter 626.1, which then acts as a recombination grating. One of the two secondary, superimposed partial beams of rays propagates twice through a glass plate 626.3, thereby forming a second optical delay line for the partial beams of rays. In this context, the second optical delay line, i.e., glass plate 626.3 is dimensioned to conform in thickness to the first optical delay line in accordance with the arrangement illustrated in FIG. 15. Due to the short coherence length of light source 621, only that partial beam of rays which, in scanning reticle 623, had propagated through the shorter path and, in the second delay line, had propagated through the longer path through glass plate 626.3, interferes with that partial beam of rays which, in scanning reticle 623, had propagated through the longer path and, in the second delay line, had propagated through the shorter path. All other pairs of partial beams of rays are not able to interfere due to the short coherence length of light source 621. Grating 626.1, acting as a recombination grating during counterpropagation of the partial beam of rays, is configured, e.g., in a conventional manner such that the beams emerging in the resulting 0 and ±1 diffraction orders are 120° phase shifted relative to one another and are converted by corresponding detector elements 626.4a to 626.4c into scanning signals S+120, S0, S−120. This variant, as well, is particularly advantageous when an optical fiber connection is to be used between light source 621, beamsplitter 622 and detection unit 626', on the one hand, and scanning reticle 623, on the other hand.

In addition to the various exemplary embodiments of the optical position-measuring device explained in detail up to this point, it should be understood that other possible arrangements may be provided. Various modifications are briefly described below.

By rearranging Equation 12, one obtains:

$$D_G = n_G \cdot D_E, \quad a_2 = -\frac{\pi}{\lambda \cdot D_E} \quad \text{(Eq. 15)}$$

$$\text{where } D_E = \frac{n_G \cdot D_A}{\sqrt{1-\left(\frac{\lambda}{d_M}\right)^2}} \quad \text{(Eq. 16)}$$

Parameters $\lambda$, $n_G$ and $D_E$ fully define the corresponding first scanning graduation. Grating period $d_M$ of the measuring graduation is not entered directly, but only indirectly by length $D_E$ in accordance with Equation 16. As long as length $D_E$ remains constant, even very different grating periods $d_M$ of the measuring graduation may be scanned using the same scanning optics. In this context, only scanning distance $D_A$ in accordance with Equation 16 is to be readily adapted, so that length $D_E$ remains constant. Since length $D_E$ is only slightly dependent on grating period $d_M$, it is possible to scan a broader range of grating periods $d_M$ of the measuring graduation even without adapting scanning distance $D_A$.

Therefore, when considered in combination with the high tolerance to Moiré tilt-angle variations, further options are possible. Thus, the very large installation and operating tolerances make it possible to scan measuring graduations configured as radial graduations as well. In the case of radial graduations, local grating period $d_M$ varies in the radial direction, while a Moiré tilting occurs in the azimuthal direction. Thus, using one and the same scanning optics, not only linear measuring graduations, but also radial graduations may be scanned, which is a significant advantage for the production and service of position-measuring devices. However, it is equally possible for the same scanning optics to scan a measuring standard having a circular graduation. In accordance with the sixth example embodiment, a scanning optics may also be used to scan a measuring graduation formed from a superimposition of a radial and circular graduation, which, locally, again forms a cross grating graduation.

In another variant of the optical position-measuring device, the two partial beams of rays may also be orthogonally polarized by other optical polarization components. Thus, for example, the first scanning graduation may also be arranged as a combined diffractive component which, in addition to the function of a ring lens (in accordance with FIG. 2a), also assumes the function of orthogonally polarizing both partial beams of rays (in accordance with FIG. 2b). This combination leads to an annular high-frequency grating which, in two halves, has orthogonal bar directions and bears a superstructure in the form of a Fresnel lens. By combining the structures from FIGS. 9a and 9b, it is possible to provide a broadening for an unlimited Moiré tilting Rz.

In addition, in the third exemplary embodiment, the $\lambda/8$ retardation plates may also be introduced into the beam path between the measuring graduation and the first scanning graduation. Also, instead of the $\lambda/8$ retardation plates, two linear, mutually orthogonal polarizers may be used.

If a measuring graduation, configured as a cross grating, needs to be scanned within the full 360° Moiré tolerance range, the two diffraction directions of the measuring graduation may then be rendered differentiable by selecting different grating periods in the x and y directions. Two side-by-side disposed scanning optics, e.g., scanning units corresponding to the fourth example embodiment, then scan such a measuring graduation. They are modified in each instance such that the first scanning optics only scans the x direction, and the second scanning optics only the y direction of the measuring graduation. This may be accomplished, for example, by selecting the radial extent of the second scanning graduations of the reflector elements to be so small that the partial beams of rays, which are formed by the grating period of the measuring graduation that is not to be scanned in the particular case, are no longer incident due to a slightly different radius $r_1$.

When the required tolerance to Moiré tilt-angle variations is smaller than +/−45°, then, in addition, the first scanning graduation and the reflector element, e.g., the second scanning graduations may be limited to sectors. Differently dimensioned first, respectively second scanning graduations may then be introduced into the sectors disposed therebetween. Thus, depending on the scanning optics installation relative to the measuring standard, the one or the other scanning optics subassembly may be used. The scanning optics subassemblies may be differently dimensioned to permit scanning of very different grating periods of the measuring graduation, for example. Given very different grating periods of the measuring graduation, radially side-by-side disposed, correspondingly dimensioned first and second scanning graduations, may be configured, which may be actively used or not used, depending on the grating period of the measuring graduation used.

Conventionally, there are a plurality of variants for the optical polarization phase detection of orthogonally polarized component beams. They are mostly described in conjunction with polarization-encoded interferometers. In this context, polarizing and non-polarizing beamsplitters are mostly used in combination with retardation plates and polarizers. Such optical-polarization phase detectors may be used in the optical position-measuring device described herein.

Moreover, it is also possible to design the optical position-measuring device as a transmitted light system having a measuring standard featuring a transmissive measuring graduation. In this case, the light source and the detection unit would be arranged in the scanning unit on one side of the measuring standard, and the first scanning graduation and the reflector element on the opposite side.

It is possible, in principle, for the light source, as well as the detection unit to be provided not directly in the scanning unit, but rather spatially distant therefrom. The illumination beam is then directed to the scanning unit, e.g., the superimposed partial beams of rays to the detection unit via suitable first and second optical waveguides. The outcoupling-side end of the first optical waveguide then functions in the scanning unit as a light source, and the incoupling-side end of the second optical waveguide as a detection unit.

In other variants of the optical position-measuring devices, the various measures elucidated in conjunction with the individual example embodiments may also be mutually combined, etc.

What is claimed is:

1. An optical position-measuring device, comprising:
   a scanning unit; and a measuring standard having a measuring graduation, the scanning unit and the measuring standard being movable in relation to each other along at least one measuring direction;

wherein the scanning unit includes a light source, a first annular scanning graduation, a reflector element, a beamsplitter element, and a detection unit;

wherein a beam emitted by the light source impinges on the measuring graduation where it is split into at least two partial beams of rays;

wherein the partial beams of rays propagate in a direction of the scanning unit impinging via the first scanning graduation on the reflector element;

wherein the partial beams of rays are reflected by the reflector element in a direction of the measuring graduation and pass through the first scanning graduation on a path to the measuring graduation;

wherein after impinging once more on the measuring graduation, the partial beams of rays propagating in a direction of the scanning unit undergo superposition and are deflected by the beamsplitter element in a direction of the detection unit, the detection unit adapted to record a plurality of positionally dependent, phase-shifted scanning signals; and wherein the first scanning graduation is adapted to induce a focusing of the partial beams of rays incident thereto from the measuring graduation at the reflector element and to thereby recollimate the partial beams of rays which, after being reflected at the reflector element, propagate in a direction of the measuring graduation.

2. The optical position-measuring device according to claim 1, wherein at least one optical polarization component is positioned in a beam path of the split partial beams of rays in order to induce a mutual, linearly or circularly orthogonal polarization of the two partial beams of rays that have been split at the measuring graduation, and polarizers are arranged in the detection unit upstream from a plurality of optoelectronic detector elements.

3. The optical position-measuring device according to claim 2, wherein the at least one optical polarization component is adapted for one of (a) an orthogonal polarization of the partial beams of rays into two diametrically disposed sectors and (b) a linear polarization that rotates azimuthally 180° over a circumference as a function of location.

4. The optical position-measuring device according to claim 2, wherein at least one high-frequency grating is arranged as an optical polarization component in a scanning beam path of the partial beams of rays.

5. The optical position-measuring device according to claim 2, wherein the reflector element is arranged as an optical polarization component.

6. The optical position-measuring device according to claim 2, wherein a plurality of optical polarization components in the form of retardation plates are arranged in a scanning beam path of the partial beams of rays one of (a) between the measuring graduation and the first scanning graduation and (b) between the first scanning graduation and the reflector element.

7. The optical position-measuring device according to claim 1, wherein, after impinging for the second time on the measuring graduation, the superimposed partial beams of rays propagate along an optical axis.

8. The optical position-measuring device according to claim 1, wherein the first scanning graduation is arranged as a diffractive ring lens having a quadratic phase function in accordance with:

$$\phi_{A1}(r) = -\frac{\pi}{d_M \cdot r_0} \cdot r^2$$

wherein $\Phi_{A1}(r)$ represents a radius-dependent phase function, r represents a radius, $d_M$ represents a grating period of the measuring graduation, and $r_0$ represents a radial distance of a principal ray impinging on the diffractive ring lens.

9. The optical position-measuring device according to claim 1, wherein the partial beams of rays propagate in parallel to an optical axis after impinging for the first time on the first scanning graduation.

10. The optical position-measuring device according to claim 1, wherein, with the exception of optical polarization components, the first scanning graduation and the reflector element are arranged cylindrically symmetrically to am optical axis, and the beam emitted by the light source propagates along the optical axis.

11. The optical position-measuring device according to claim 1, wherein the measuring graduation is arranged as one of (a) a one-dimensional linear graduation, (b) a two-dimensional linear graduation, (c) a radial graduation, and (d) a circular graduation.

12. The optical position-measuring device according to claim 1, wherein a diffractive structure is located in a region of a scanning reticle through which the beam emitted by the light source passes, the diffractive structure being arranged as at least one of (a) a collimating lens for an incident beam from the light source and (b) a grating beamsplitter for incident, superimposed partial beams of rays from the measuring graduation, the first scanning graduation being arranged on one of (a) a front side and (b) the rear side of the scanning reticle and the reflector element being arranged on the other of (a) a front side and (b) the rear side of the scanning reticle.

13. The optical position-measuring device according to claim 1, wherein the detection unit includes a beamsplitter which spatially divides incident, superimposed partial beams of rays, and the divided partial beams of rays each propagate through polarizers before impinging on optoelectronic detector elements.

14. The optical position-measuring device according to claim 13, wherein the beamsplitter is arranged as a grating beamsplitter.

15. The optical position-measuring device according to claim 1, wherein an optical delay line is arranged in a beam path of a partial beam of rays.

* * * * *